US012196010B2

(12) United States Patent
Pan et al.

(10) Patent No.: US 12,196,010 B2
(45) Date of Patent: Jan. 14, 2025

(54) LOCKSET

(71) Applicant: SINOX CO., LTD, New Taipei (TW)

(72) Inventors: Kuo-Kuang Pan, New Taipei (TW); Chia-Ming Wu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 449 days.

(21) Appl. No.: 17/574,985

(22) Filed: Jan. 13, 2022

(65) Prior Publication Data

US 2022/0235586 A1 Jul. 28, 2022

(30) Foreign Application Priority Data

Jan. 22, 2021 (TW) ................................ 110200868
May 27, 2021 (TW) ................................ 110206127

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01); *E05B 73/0005* (2013.01)

(58) Field of Classification Search
CPC ...... E05B 73/00; E05B 73/0082; E05B 37/02; Y10T 70/5009
USPC .............................................................. 70/58
See application file for complete search history.

(56) References Cited

U.S. PATENT DOCUMENTS 11,680,429 B2 * 6/2023 Kao ...................... G06F 1/1616 361/679.55
2006/0091679 A1 5/2006 Tsai
2007/0169523 A1 * 7/2007 Lu ...................... E05B 73/0082 70/58

(Continued)

FOREIGN PATENT DOCUMENTS

CN 101131059 A 2/2008
CN 202324922 U 7/2012

(Continued)

OTHER PUBLICATIONS

Great Britain Search Report for Application No. GB2200509.4 Dated Jun. 28, 2022.

(Continued)

*Primary Examiner* — Suzanne L Barrett
(74) *Attorney, Agent, or Firm* — Birch, Stewart, Kolasch & Birch, LLP

(57) ABSTRACT

A lockset is provided. The lockset includes a housing, at least one hook, a driving device, and a lock body. The hook is disposed in the housing and is rotatable relative to the housing. The driving device includes a force application member and a driving member. The force application member includes a force bearing portion at least partially disposed inside the housing and a force application portion disposed inside the housing. The force bearing portion is connected to the force application portion and is rotatable with the force application portion relative to the housing. The driving member is disposed in the housing and rotatable with the force application portion, to selectively move to (Continued)

change an opening width of the hooks. The lock body is disposed on a side of the driving device, wherein the lock body restricts a movement of the driving device when the lock body is locked.

10 Claims, 13 Drawing Sheets

(56) References Cited

U.S. PATENT DOCUMENTS

| | | | | |
|---|---|---|---|---|
| 2008/0034816 | A1* | 2/2008 | Lu | E05B 73/0082 70/58 |
| 2014/0069153 | A1* | 3/2014 | Wu | E05B 73/0082 70/58 |
| 2016/0333613 | A1* | 11/2016 | Avganim | E05B 73/0082 |
| 2018/0058105 | A1 | 3/2018 | Van Klompenburg et al. | |
| 2018/0363334 | A1* | 12/2018 | Wu | E05B 73/0005 |
| 2020/0173203 | A1* | 6/2020 | Avganim | E05B 73/0005 |
| 2020/0248477 | A1 | 8/2020 | Wu et al. | |
| 2021/0025200 | A1* | 1/2021 | Wu | E05B 73/0082 |

FOREIGN PATENT DOCUMENTS

| | | | |
|---|---|---|---|
| CN | 206158373 | U | 5/2017 |
| CN | 209620909 | U | 11/2019 |
| CN | 212249588 | U | 12/2020 |
| JP | 2010-159575 | A | 7/2010 |

OTHER PUBLICATIONS

Great Britain Search Report for Application No. GB2200510.2 Dated Jun. 28, 2022.

* cited by examiner

LOCKSET

TECHNICAL FIELD

The utility model relates to a lockset. Further, the utility model relates to a lockset for an electronic device.

BACKGROUND

In modern life, consumer electronic products play an important role. In view of the fast lifestyle and the demand of people for instant information, portable electronic products become one of necessities of people. However, the products are easily stolen or robbed due to relatively high unit prices and ease of cash realization.

For prevention of thievery, a lockset is designed, such as a notebook computer lock. A lock fastener of the notebook computer lock may be connected to a lock hole of an electronic product, and a movement of the lock fastener is controlled by using a key lock mechanism to complete locking/unlocking. However, due to lock holes of different specifications, a user needs to purchase/carry a lockset having a corresponding lock fastener according to the specification of a lock hole, which is not only uneconomical but also inconvenient to use.

SUMMARY

The utility model is intended to provide a lockset. The lockset is applicable to lock holes of different sizes and is convenient to use.

The lockset of the utility model includes a housing, at least one hook, a driving device, and a lock body. The housing has a front opening at an end. The hook is disposed in the housing and is rotatable relative to the housing. The hook includes front end portions and rear end portions, wherein at least part of the front end portions extends out of the front opening, and the rear end portions extend in a direction opposite to the direction in which the front end portions extend. The driving device includes a force application member and a driving member. The force application member includes a force bearing portion at least partially disposed inside the housing and a force application portion disposed inside the housing. The force bearing portion is connected to the force application portion and is rotatable with the force application portion relative to the housing. The driving member is disposed in the housing and rotatable with the force application portion, to selectively move between the rear end portions to change an opening width of the front end portions. The lock body is disposed on a side of the driving device, wherein the lock body restricts a movement of the driving device when the lock body is locked.

In an embodiment of the utility model, at least one of the hooks is rotatable relative to the housing along a plane parallel to an X-Y plane. The force application member is rotatable along a plane parallel to an X-Z plane. The driving member is selectively movable to extend different depths between the rear end portions in a Y-axis direction, so as to change the opening width of the front end portions. An X axis, a Y axis, and a Z axis are orthogonal.

In an embodiment of the utility model, the force application portion has a driving portion. An end of the driving member is movable in the Y-axis direction to be snapped in the driving portion, so that the driving member is rotatable with the force application member.

In an embodiment of the utility model, the driving device further includes a displacement restriction member fixed in the housing. The displacement restriction member therein has an accommodating space extending along the Y axis. A sidewall thread is disposed on a sidewall of the accommodating space. The driving member is disposed in the accommodating space. The driving member is a circular cylinder having a driving member thread on a side surface that is mated with the sidewall thread. When the force application member is rotated, the driving member is rotated with the force application member. Under the action between the sidewall thread and the driving member thread, an end of the driving member that faces the rear end portions is moved in the Y-axis direction for extending different depths between the rear end portions.

In an embodiment of the utility model, the housing therein has an accommodating space extending along the Y axis. A sidewall thread is disposed on a sidewall of the accommodating space. The driving member is disposed in the accommodating space. The driving member is a circular cylinder having a driving member thread on a side surface that is mated with the sidewall thread. When the force application member is rotated, the driving member is rotated with the force application member. Under the action between the sidewall thread and the driving member thread, an end of the driving member that faces the rear end portions is moved in the Y-axis direction for extending different depths between the rear end portions.

In an embodiment of the utility model, a part of the force bearing portion is exposed from the housing.

In an embodiment of the utility model, the lock body includes a snapping member which is movable along the Y-axis direction. When the lock body is locked, an end of the snapping member is snapped in the force application member to restrict the rotation of the force application member.

In an embodiment of the utility model, the lock body is a key lock, and the snapping member includes a protruding post.

In an embodiment of the utility model, the lock body is a combination lock, and the snapping member includes a lock shaft rod.

In an embodiment of the utility model, the lockset further includes an elastic member configured to provide an elastic force so that the rear end portions approach each other.

DETAILED DESCRIPTION

Figure 1A:
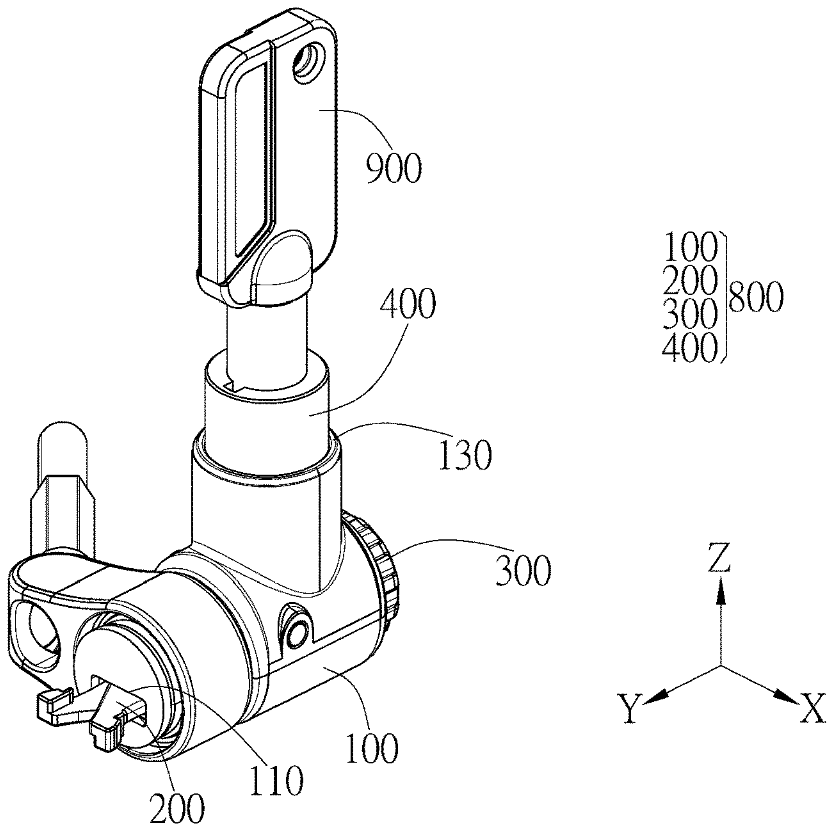
FIG. 1A and FIG. 1B are schematic diagrams of an embodiment of a lockset according to the utility model.
Figure 1B:
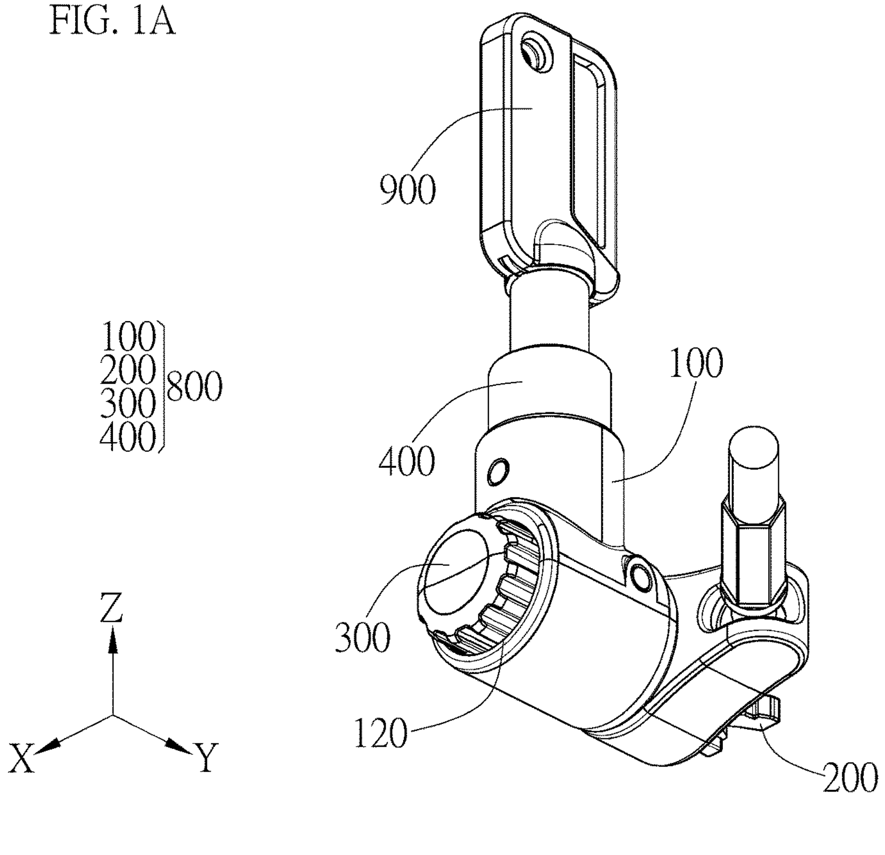

A lockset of the utility model is applicable to an electronic device, and is connected to a lock hole on the electronic device. The electronic device is preferably a portable electronic device, such as, but is not limited to, a notebook computer, a tablet computer, a mobile phone, an e-book, a digital frame, a global positioning system (GPS) navigator, a mobile network device, a personal digital assistant, a digital walkman, or an electronic dictionary.

In different embodiments, the lockset may vary. In an embodiment shown in FIG. 1A to FIG. 2B, a lockset 800 of the utility model includes a housing 100, at least one hook 200, a driving device 300, and a lock body 400. The housing 100 has a front opening 110 at an end. Each hook 200 is disposed in the housing 100, and is rotatable relative to the housing 100. In this embodiment, two hooks 200 are disposed in the housing 100, and are rotatable relative to the housing 100 along a plane parallel to an X-Y plane, and are scissor-shaped. However, in a different embodiment, there may be only one hook 200 used with another non-rotary fixing member, and is not limited to the scissor shape. Each hook 200 includes front end portions 210 and rear end portions 220. At least part of the front end portions 210 extends out of the front opening 110. A hook portion 211 laterally extending is disposed at an end of each front end portion 210. The rear end portions 220 extend in a direction opposite to the direction in which the front end portions 210 extend. An X axis, a Y axis, and a Z axis are orthogonal.

Figure 2A:
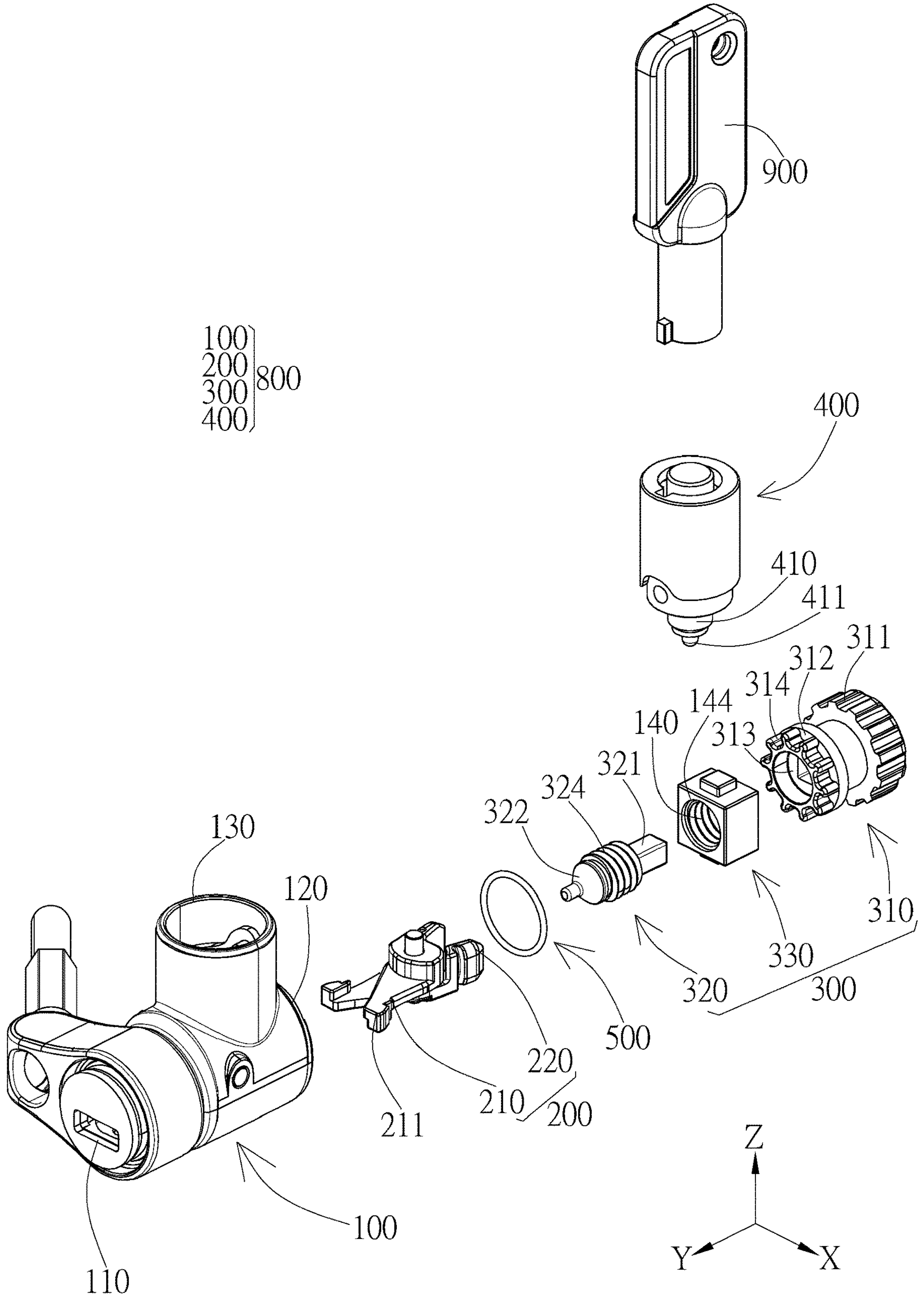
FIG. 2A and FIG. 2B are schematic exploded views of the embodiment of the lockset according to the utility model.
Figure 2B:
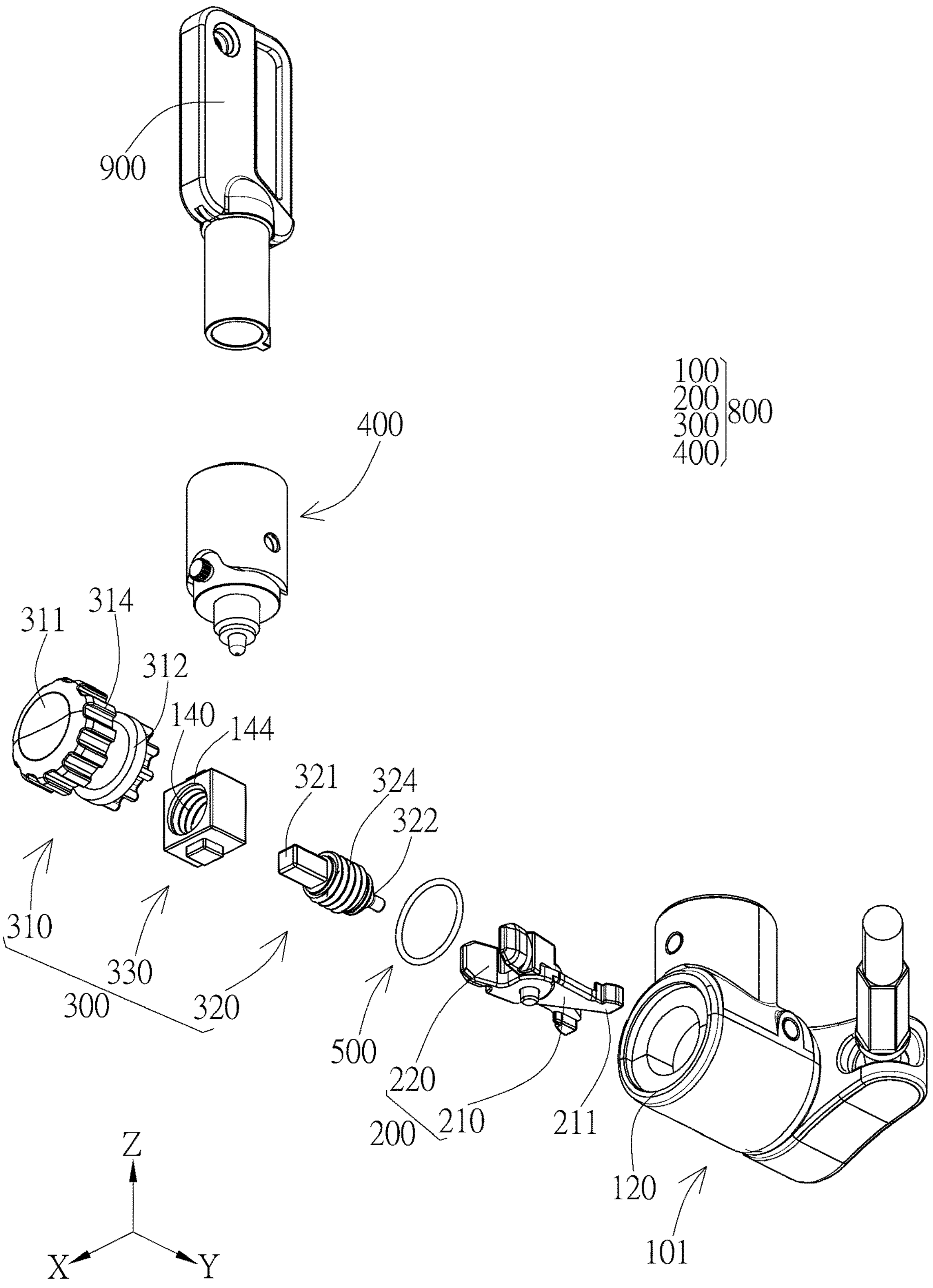

In an embodiment shown in FIG. 2A and FIG. 2B, the driving device 300 includes a force application member 310 and a driving member 320. The force application member 310 is rotatable along a plane parallel to an X-Z plane, and includes a force bearing portion 311 partially disposed inside the housing 100 and a force application portion 312 disposed inside the housing 100. The force bearing portion 311 is connected to the force application portion 312 by penetrating the housing 100, and is rotatable with the force application portion relative to the housing 100. More specifically, in the embodiment shown in FIG. 2A, the housing 100 has a rear opening 120. The force bearing portion 311 is connected to the force application portion 312 by penetrating the housing 100 through the rear opening 120. A part of the force bearing portion 311 is exposed from the housing 100. However, in a different embodiment, the force bearing portion 311 is completely disposed in the housing 100, or at least does not protrude out of the housing 100. A user may rotate the force bearing portion 311 with a screw driver or the like.

Figure 3A:
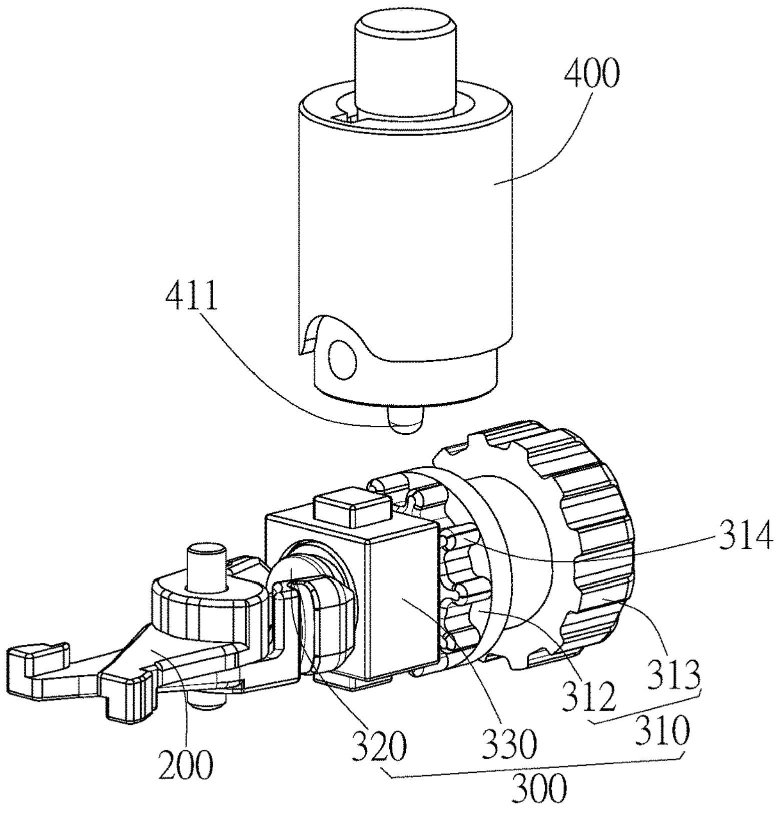
FIG. 3A and FIG. 3B are schematic diagrams of an embodiment of a lockset according to the utility model in which an end of the snapping member extends into the plurality of protruding members.
Figure 3B:
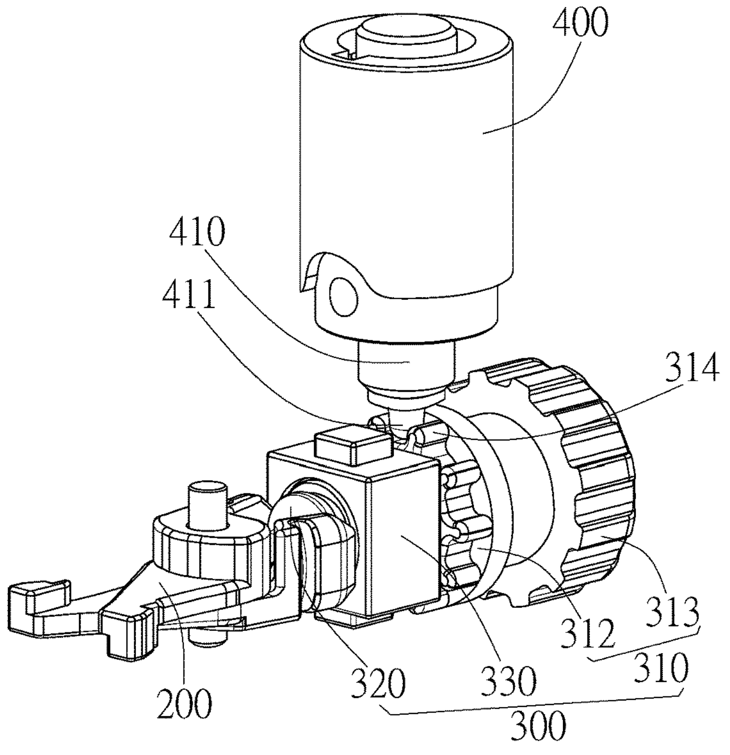

In an embodiment shown in FIG. 1A to FIG. 2B, the driving member 320 is disposed in the housing 100, and is rotatable with the force application portion 312. The lock body 400 is disposed on a side of the driving device 300. The lock body 400 restricts a movement of the driving device 300 when locked. More specifically, in an embodiment shown in FIG. 3A and FIG. 3B, the force application portion 312 is a disc having a plurality of protruding members 314 disposed at a peripheral edge. The lock body 400 includes a snapping member 410 which is movable along a Y-axis direction. When the lock body 400 is locked, an end of the snapping member 410 extends into the plurality of protruding members 314 to restrict the rotation of the force application member 310. The snapping member 410 includes a protruding post 411. However, in a different embodiment, the force application portion 312 is not limited to the disc having a plurality of protruding members 314 disposed at the peripheral edge, as long as the snapping member 410 can be limited by means of shape matching or friction. For example, a plurality of holes may be provided on the peripheral edge of the force application portion 312 for insertion of the protruding post 411. In other words, when the lock body 400 is locked, an end of the snapping member 410 is snapped in the force application member 310 to restrict the rotation of the force application member 310. In this embodiment, the lock body 400 is a key lock used with a key 900. For example, the lock body 400 communicates with the outside of the housing 100 through a side opening 130, so as to insert and operate the key 900.

In the embodiment shown in FIG. 2A and FIG. 2B, the driving member 320 is disposed in the housing 100, and is rotatable with the force application portion 312 to selectively move between the rear end portions 220, so as to change an opening width of the front end portions 210. In this embodiment, the force application portion 312 has a driving portion 313. An end 321 of the driving member 320 is movable in the Y-axis direction to be snapped in the driving portion 313, so that the driving member 320 is rotatable with the force application member 310. More specifically, the driving portion 313 is polygonal. The end 321 of the driving member 320 is a polygonal cylinder having an outer contour matching the driving portion 313. Thus, when the end 321 of the driving member 320 is inserted into the driving portion 313, snapping achieved on the X-Z plane, so that the driving member 320 is rotatable with the force application member 310. However, snapping is not achieved in the Y-axis direction, and therefore relative movement is allowed. However, in a different embodiment, the driving member 320 and the driving portion 313 may be other objects mated with each other, and may include a plurality of driving members and driving portions.

Figure 4A:
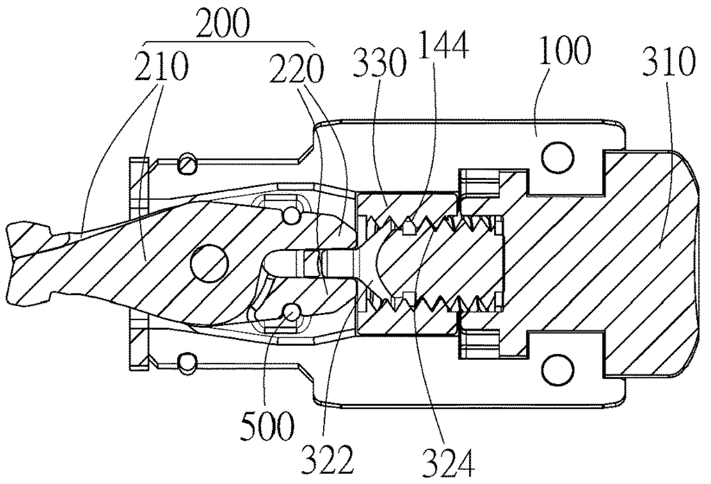
FIG. 4A to FIG. 4D are schematic diagrams of an embodiment of a lockset according to the utility model in which an end of the driving member moves for extending different depths between the rear end portions.
Figure 4B:
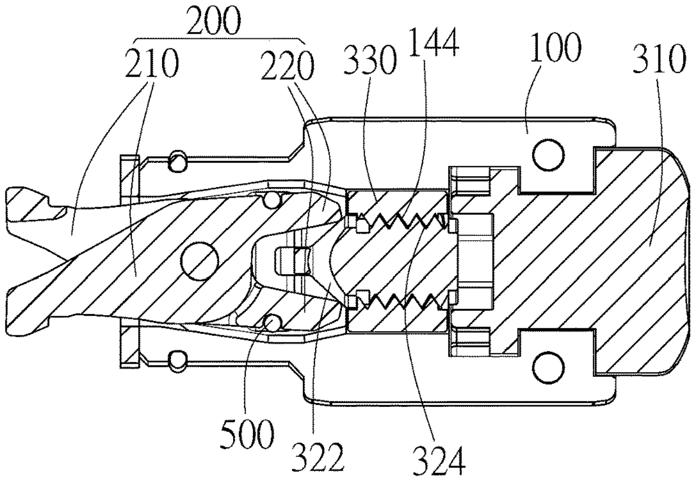
Figure 4C:
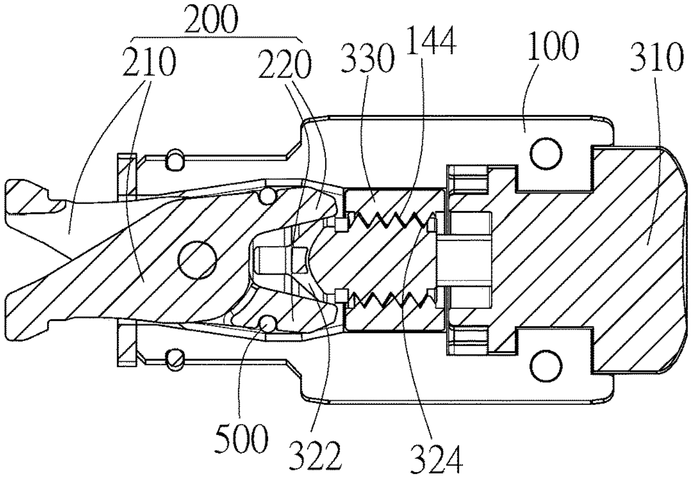
Figure 4D:
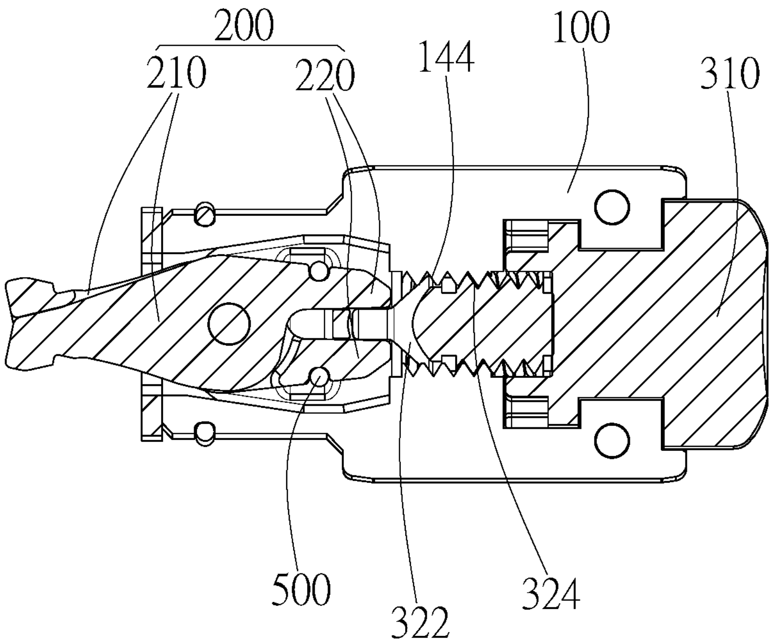

Further, in an embodiment shown in FIG. 2A, FIG. 2B, FIG. 4A to FIG. 4C, the driving device 300 further includes a displacement restriction member 330 fixed in the housing 100. The displacement restriction member 330 therein has an accommodating space 140 extending along the Y axis. A sidewall thread 144 is disposed on a sidewall of the accommodating space 140. The driving member 320 is disposed in the accommodating space 140. The driving member 320 is a circular cylinder having a driving member thread 324 on a side surface that is mated with the sidewall thread 144. By means of the abutment between the sidewall thread 144 and the driving member thread 324, when the force application member 310 is rotated, the driving member 320 is rotated with the first driving member. In this way, an end 322 of the driving member 320 that faces the rear end portions 220 is moved in the Y-axis direction for extending different depths between the rear end portions 220. The end 322 of the driving member 320 that faces the rear end portions 220 has an inclined plane, helping the end 322 move in the Y-axis direction for extending different depths between the rear end portions 220 and spread the rear end portions 220. However, in a different embodiment shown in FIG. 4D, the accommodating space 140 may be directly provided in the housing 100. That is to say, the sidewall thread 144 is directly disposed on an inner side of the housing 100. In this case, the displacement restriction member 330 is omitted. In addition, the lockset 800 further includes an elastic member 500, such as a rubber ring. The elastic member is configured to provide an elastic force so that the rear end portions 220 approach each other.

Figure 5A:
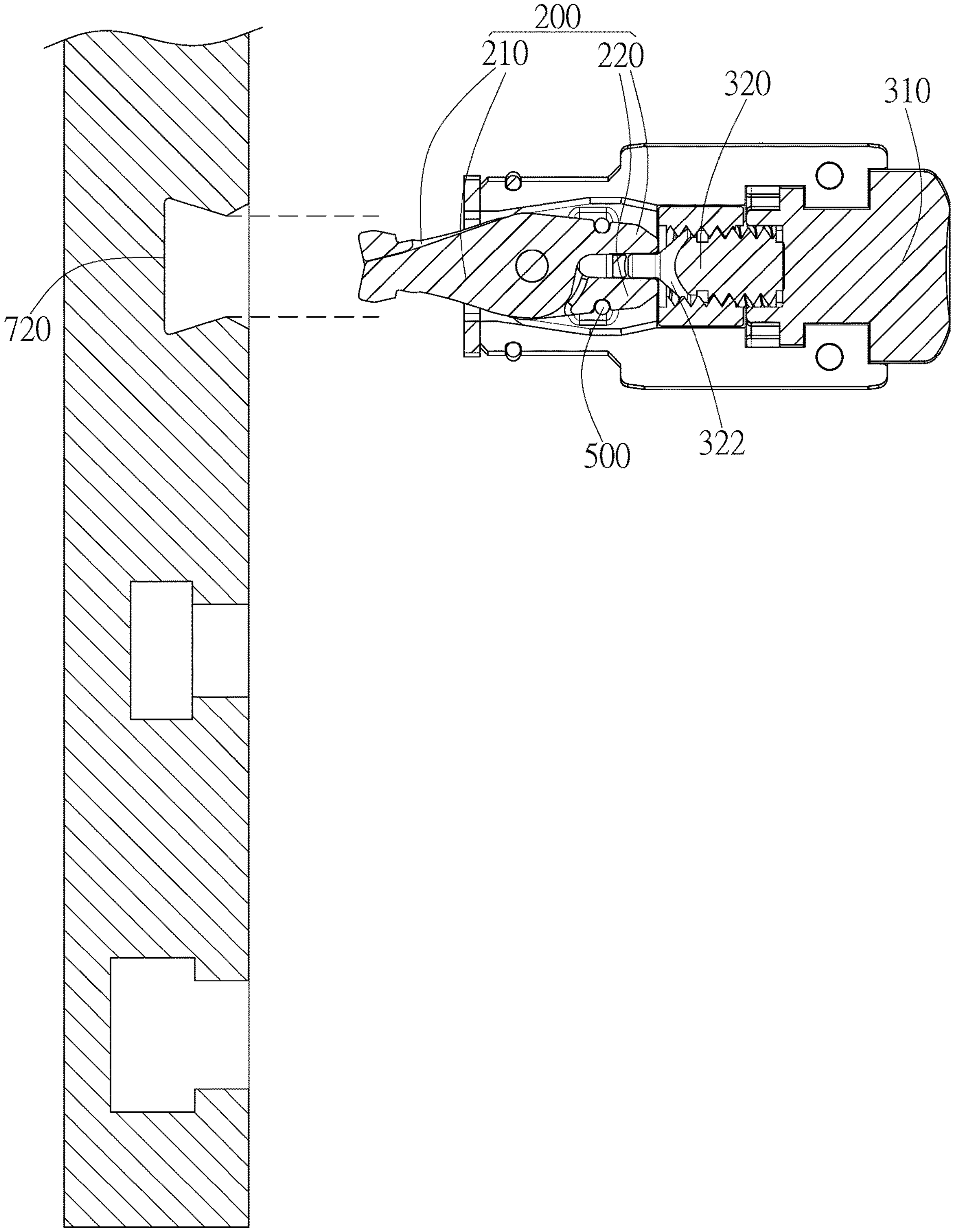
FIG. 5A to FIG. 5C are schematic diagrams of an embodiment of a lockset according to the utility model in which a lockset is locked in a lock hole.
Figure 5B:
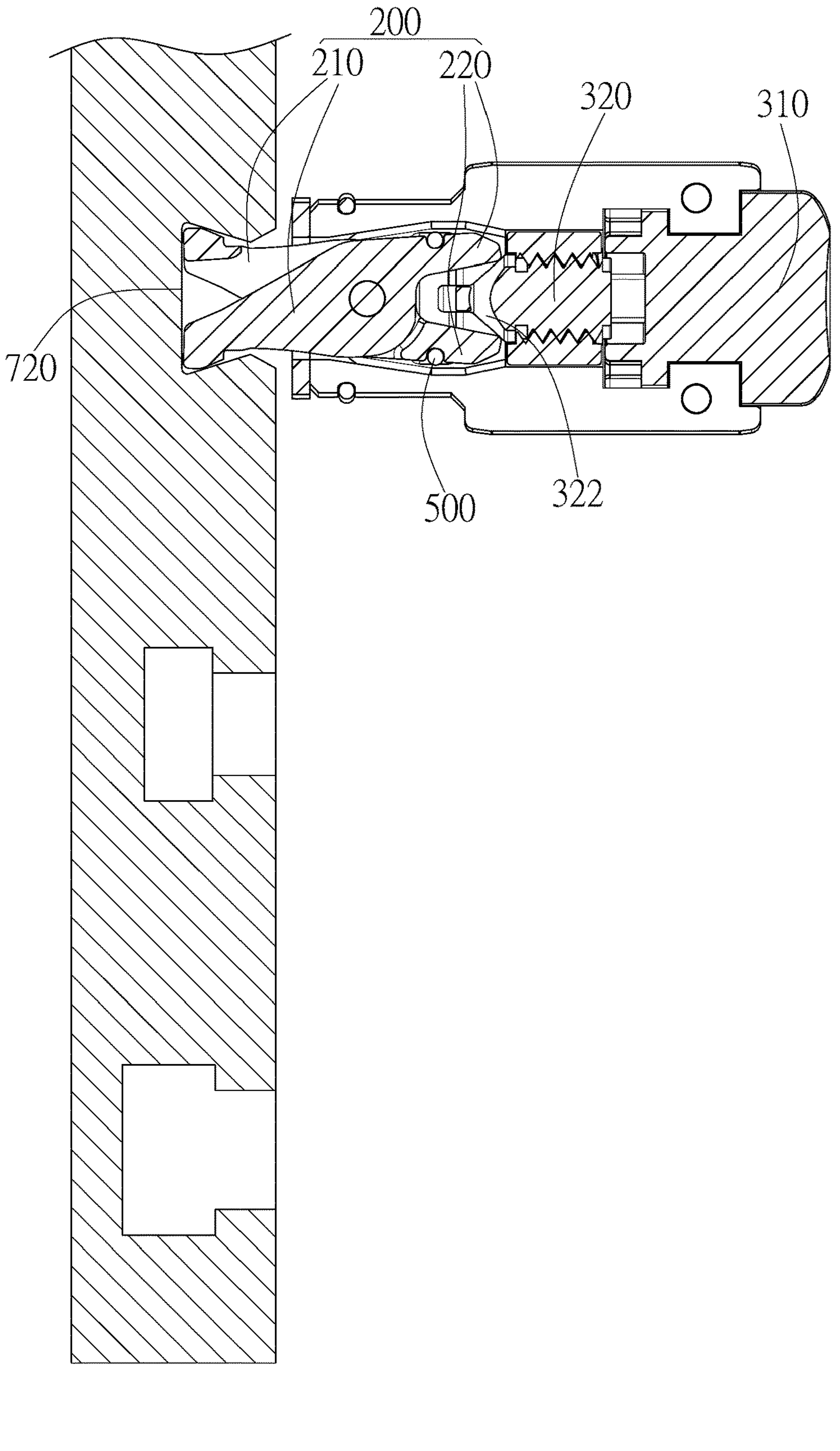
Figure 5C:
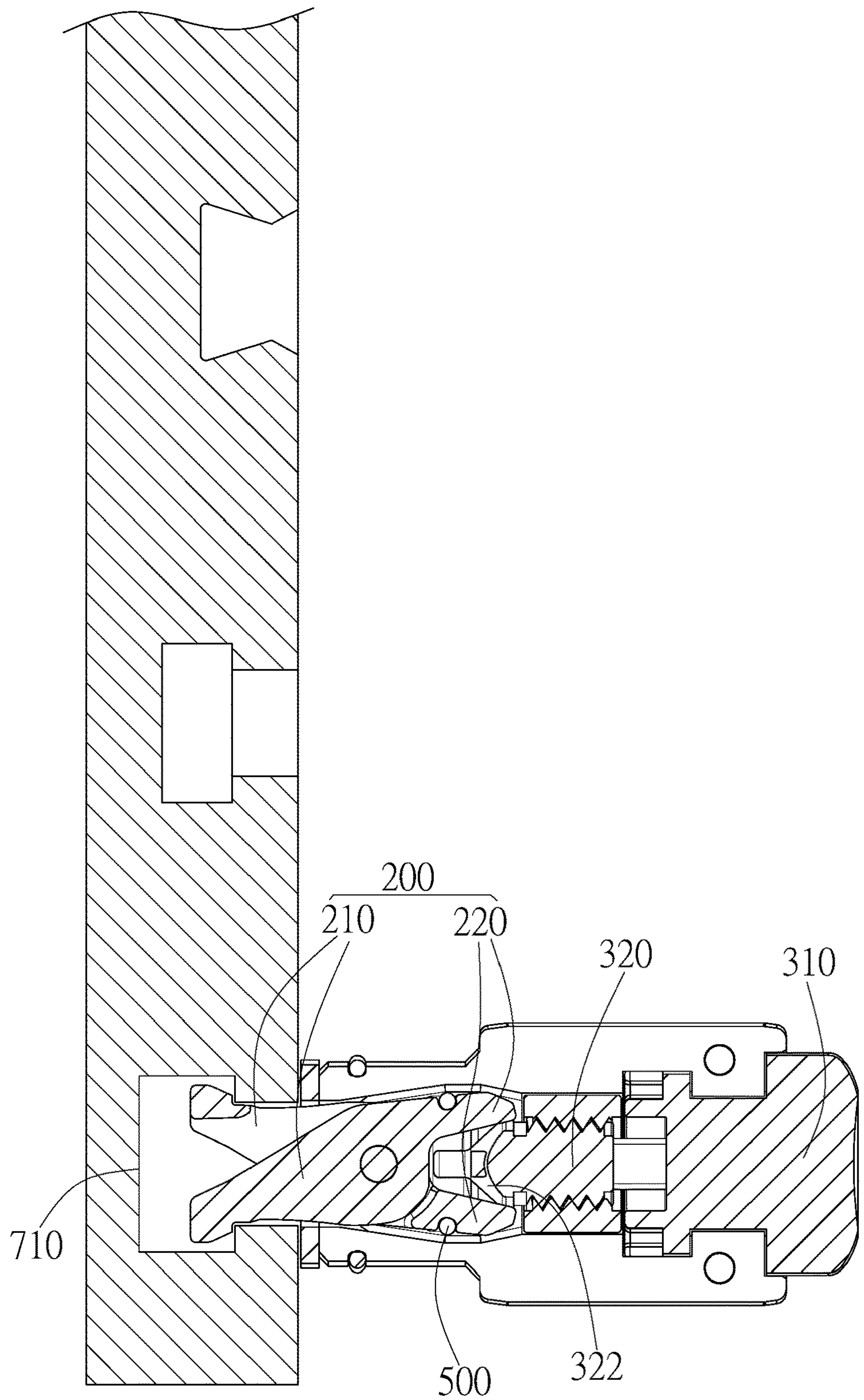
Figure 6A:
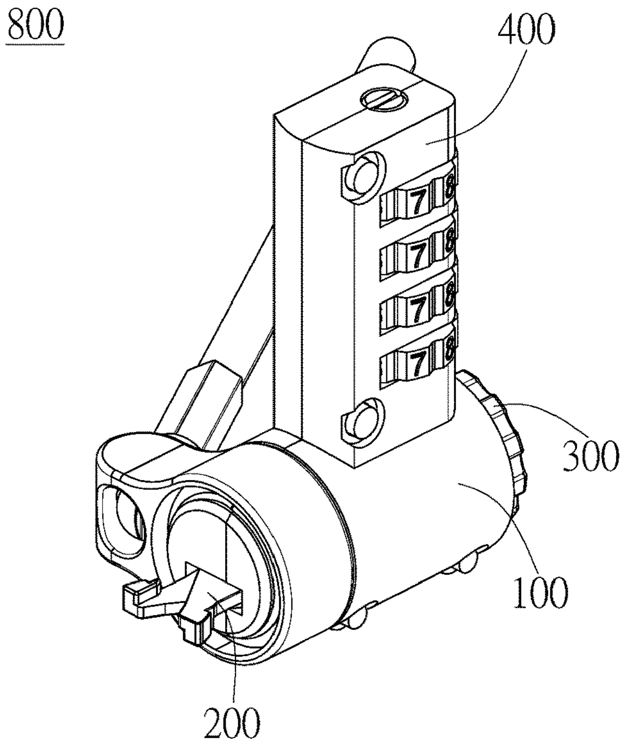
FIG. 6A and FIG. 6B are schematic diagrams of different embodiment of a lockset according to the utility model.
Figure 6B:
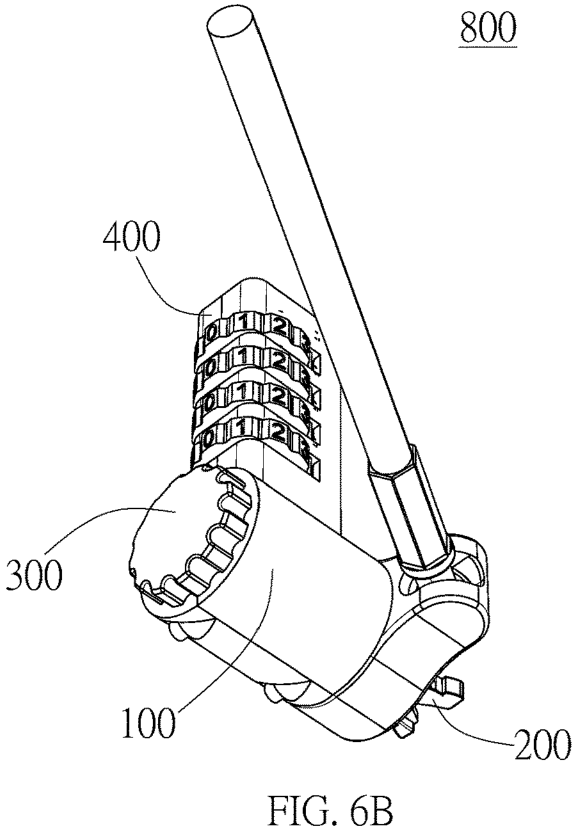
Figure 7A:
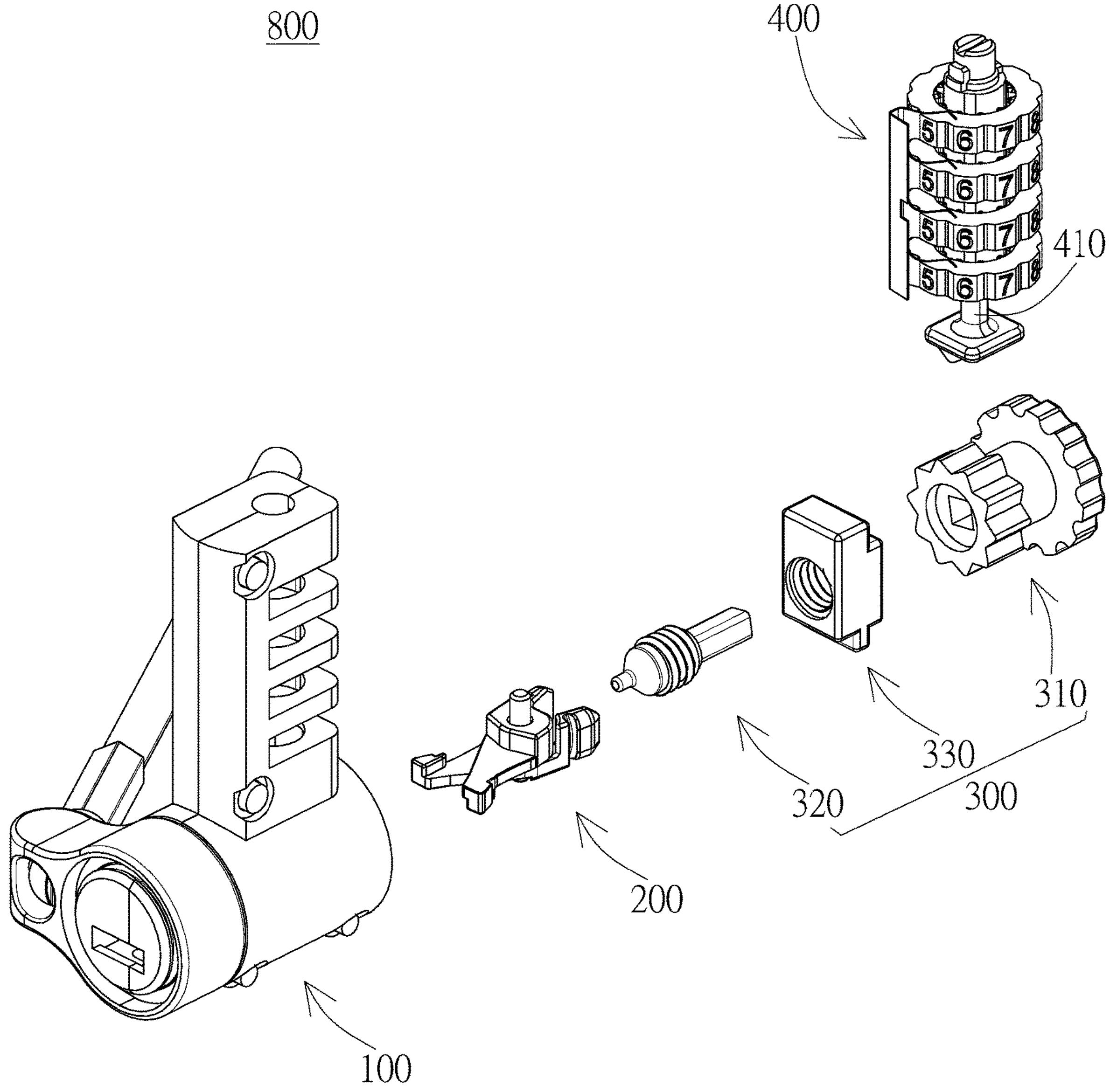
FIG. 7A and FIG. 7B are schematic exploded views of different embodiment of the lockset according to the utility model.
Figure 7B:
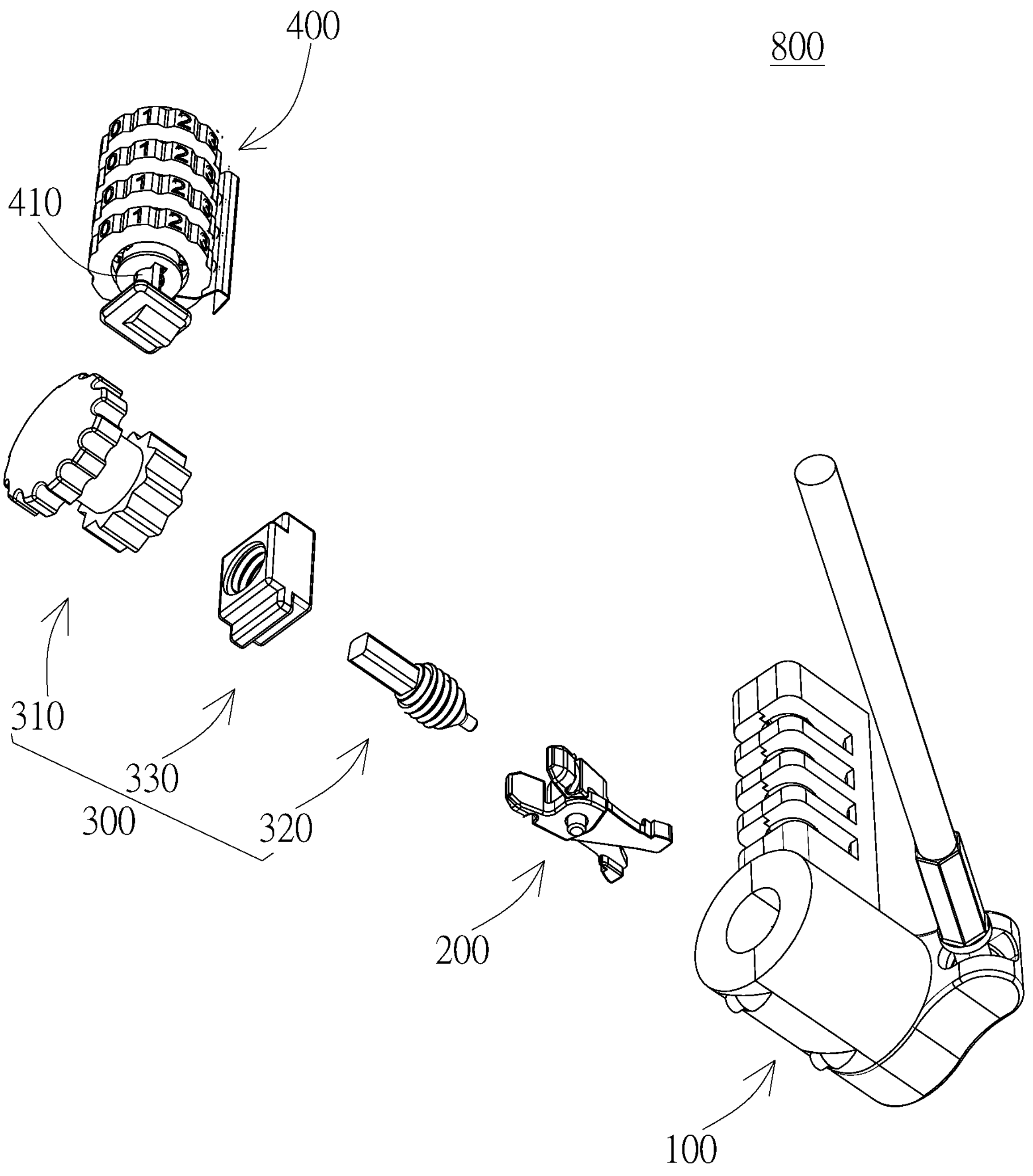
Figure 8A:
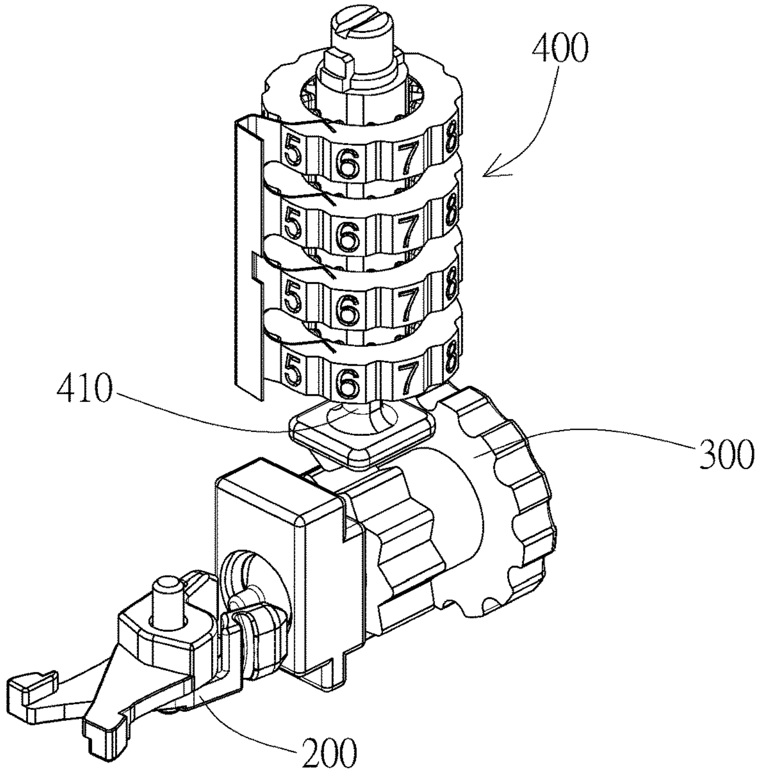
FIG. 8A and FIG. 8B are schematic diagrams of different embodiment of a lockset according to the utility model in which an end of the snapping member extends into the plurality of protruding members.
Figure 8B:
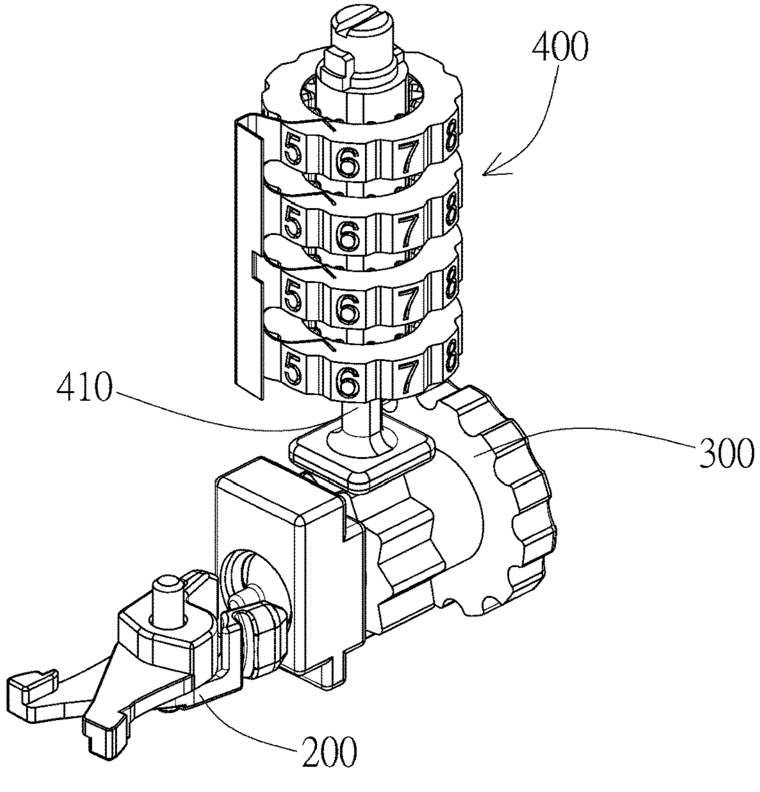

In an embodiment shown in FIG. 5A, a user may rotate the force application member 310 in a direction, so that the end 322 of the driving member 320 that faces the rear end portions 220 is moved in the Y-axis direction to escape from the position between the rear end portions 220. In this case, by means of the elastic force of the elastic member 500, the rear end portions 220 can approach each other, so that the opening width of the front end portions 210 is reduced, thereby inserting the front end portions into a lock hole 720. In an embodiment shown in FIG. 5B, after the front end portions 210 are inserted into the lock hole 720, the user may reversely rotate the force application member 310, so that the end 322 of the driving member 320 that faces the rear end portions 220 is moved in the Y-axis direction to partially extend between the rear end portions 220. Therefore, the rear end portions 220 can be moved away from each other, to increase the opening width of the front end portions 210, thereby snapping the front end portions in the lock hole 720. In this way, the user may further lock the lock body 400 (referring to FIG. 2A) to fix the front end portions 210, so as to achieve locking. In another embodiment shown in FIG. 5C, after the front end portions 210 are inserted into a lock hole 710, the user may rotate the force application member 310, so that the end 322 of the driving member 320 that faces the rear end portions 220 is moved in the Y-axis direction to extend between the rear end portions 220 to a greater extent. In this case, the rear end portions 220 can be moved away from each other, to further increase the opening width of the front end portions 210, thereby snapping the front end portions in the larger lock hole 710. Then, the user may further operate the lock body 400 to achieve locking.

In a different perspective, in the lockset 800 of the utility model, the opening width of the hook 200 is adjusted by rotating the driving device 300. Since the force application member 310 and the driving member 320 of the driving device 300 achieve mating and snapping by using the gear, the thread, and the like, the opening width of the hook 200 may be controlled according to a degree of rotation. Since the rotation is substantially a continuous operation, continuous control of the opening width of the hook 200 can be achieved. Therefore, the utility model is applicable to lock holes of different sizes and is convenient to use.

In the foregoing embodiments, the lock body 400 is a key lock. However, in an embodiment shown in FIG. 6A to 8B or another different embodiment, the lock body 400 may be a different lock, such as a combination lock. In an embodiment shown in FIG. 7A to 8B, the lock body 400 is a combination lock. The snapping member 410 includes a lock shaft rod. More specifically, when the lock body 400 is locked, an end of the lock shaft rod of the snapping member 410 extends into the plurality of protruding members to restrict a movement of the driving device 300, so as to restrict the rotation of the hook 200.

Although the foregoing description and drawings have disclosed exemplary embodiments of the utility model, it is necessary to understand that various additions, many modifications, and substitutions may be used in the exemplary embodiments of the utility model without departing from the spirit and scope of the principle of the utility model as defined in the claims attached. A person of original skill in the art of the utility model may understand that modifications of various forms, structures, arrangements, ratios, materials, elements and components may be made to the utility model. Therefore, the embodiments disclosed in this specification shall be construed as describing the utility model, but are not intended to limit the utility model. The scope of the utility model shall be subject to those defined in the attached claims, covers legal equivalents thereof, and is not limited to the foregoing description.

What is claimed is:

1. A lockset, comprising:
a housing, having a front opening at an end;
at least one hook, each disposed in the housing, rotatable relative to the housing, and comprising front end portions and rear end portions, wherein at least part of the front end portions extends out of the front opening, and the rear end portions extend in a direction opposite to the direction in which the front end portions extend;
a driving device, comprising:
a force application member, comprising a force bearing portion at least partially disposed inside the housing and a force application portion disposed inside the housing, wherein the force bearing portion is connected to the force application portion, and is rotatable with the force application portion relative to the housing, and
a driving member, disposed in the housing and rotatable with respect to a Y-axis with the force application portion, to selectively move along the Y-axis between the rear end portions to change an opening width of the front end portions; and
a lock body, disposed on a side of the driving device, wherein the lock body restricts a movement of the driving device when locked.

2. The lockset according to claim 1, wherein at least one of the hooks is rotatable relative to the housing along a plane parallel to an X-Y plane, the force application member is rotatable along a plane parallel to an X-Z plane, the driving member is selectively movable to extend different depths between the rear end portions in a Y-axis direction, so as to change the opening width of the front end portions, wherein an X axis, the Y axis, and a Z axis are orthogonal.

3. The lockset according to claim 2, wherein
the force application portion has a driving portion; and
an end of the driving member is movable in the Y-axis direction to be snapped in the driving portion, so that the driving member is rotatable with the force application member.

4. The lockset according to claim 3, wherein
the driving device further comprises a displacement restriction member fixed in the housing, the displacement restriction member therein has an accommodating space extending along the Y axis, and a sidewall thread is disposed on a sidewall of the accommodating space;
the driving member is disposed in the accommodating space, and the driving member is a circular cylinder having a driving member thread on a side surface that is mated with the sidewall thread; and
when the force application member is rotated, the driving member is rotated with the force application member, and under the action between the sidewall thread and the driving member thread, an end of the driving member that faces the rear end portions is moved in the Y-axis direction for extending different depths between the rear end portions.

5. The lockset according to claim 3, wherein
the housing therein has an accommodating space extending along the Y axis, and a sidewall thread is disposed on a sidewall of the accommodating space;
the driving member is disposed in the accommodating space, and the driving member is a circular cylinder having a driving member thread on a side surface that is mated with the sidewall thread; and when the force application member is rotated, the driving member is rotated with the force application member, and under the action between the sidewall thread and the driving member thread, an end of the driving member that faces the rear end portions is moved in the Y-axis direction for extending different depths between the rear end portions.

6. The lockset according to claim 1, wherein a part of the force bearing portion is exposed from the housing.

7. The lockset according to claim 2, wherein the lock body comprises a snapping member which is movable along the Y-axis direction, and when the lock body is locked, an end of the snapping member is snapped in the force application member to restrict the rotation of the force application member.

8. The lockset according to claim 7, wherein the lock body is a key lock, and the snapping member comprises a protruding post.

9. The lockset according to claim 7, wherein the lock body is a combination lock, and the snapping member comprises a lock shaft rod.

10. The lockset according to claim 1, further comprising an elastic member, configured to provide an elastic force so that the rear end portions approach each other.

* * * * *